United States Patent [19]

Arzubi

[11] 3,755,791

[45] Aug. 28, 1973

[54] MEMORY SYSTEM WITH TEMPORARY OR PERMANENT SUBSTITUTION OF CELLS FOR DEFECTIVE CELLS

[75] Inventor: Luis Maria Arzubi, Colchester, Vt.

[73] Assignee: International Business Machines Corporation, Armonk, N.Y.

[22] Filed: June 1, 1972

[21] Appl. No.: 258,572

[52] U.S. Cl. ..... 340/173 R, 340/172.5, 340/173 FF
[51] Int. Cl. .......................... G06f 11/00, G11c 7/00
[58] Field of Search ..................... 340/173 R, 172.5, 340/173 FF

[56] References Cited

UNITED STATES PATENTS

| | | | |
|---|---|---|---|
| 3,331,058 | 7/1967 | Perkins, Jr. | 340/172.5 |
| 3,560,764 | 2/1971 | McDowell | 340/173 FF |
| 3,585,607 | 6/1971 | DeHaan et al. | 340/173 R |
| 3,432,812 | 3/1969 | Elfant | 340/172.5 |
| 3,245,049 | 4/1966 | Sakalay | 340/172.5 |
| 3,588,830 | 6/1971 | Duds | 340/172.5 |
| 3,422,402 | 1/1969 | Sakalay | 340/172.5 |

OTHER PUBLICATIONS

Chin et al. Reversible On-Chip Redundancy Scheme, 3/72, IBM Technical Disclosure Bulletin, Vol. 14, No. 10, pp. 2983–2984.

*Primary Examiner*—Bernard Konick
*Assistant Examiner*—Stuart N. Hecker
*Attorney*—Francis J. Thornton et al.

[57] ABSTRACT

A memory storage system comprising both a main memory array and an alternate storage memory array coupled by a circuit that can either semipermanently or reversibly substitute the alternate array for a portion of the main array and retain the alternate array in its substituted position even when the memory is in a power down condition.

The described circuit achieves this by utilizing nonvolatile semiconductor devices arranged in a cross coupled configuration that can, if desired, be made to either temporarily or semipermanently substitute the alternate array for any desired portion of the main array.

9 Claims, 2 Drawing Figures

MEMORY SYSTEM WITH TEMPORARY OR PERMANENT SUBSTITUTION OF CELLS FOR DEFECTIVE CELLS

RELATED INVENTIONS

A pending U.S. application Ser. No. 172,800 assigned to the same assignee as the present invention hereof teaches a memory system using a redundancy technique in which a monolithic memory array is provided with an extra line of cells in the array together with a defective address store and a comparator circuit for disabling a defective line of cells and replacing it with the extra line of cells.

BACKGROUND OF THE INVENTION

This invention relates generally to large scale monolithic memory arrays for use in memory systems and more particularly to a monolithic memory array that can have the redundant line accessed and substituted for a line in the main array.

DESCRIPTION OF THE PRIOR ART

Monolithic integrated semiconductor structures having a plurality of functionally isolated individual cells that are electrically interconnected to provide a monolithic memory array have been described in U.S. Pat. No. 3,508,209, to B. Agusta et al., issued Apr. 21, 1970, and assigned to the same assignee as present invention.

U.S. Pat. No. 3,633,268, discloses a method of producing integrated semiconductor circuits in which the usable circuits on a semiconductor wafer are connected together, and the useless circuits bypassed, through the utilization of a final mask and metallization procedure.

U.S. Pat. No. 3,588,830, teaches a system for utilizing batch fabricated memories having bad bits therein. This patent accomplishes this by having an error correction memory which stores the location and correct information to be substituted for each bad bit in the main bulk memory and arranging this error correction memory with the main memory so that both are accessed simultaneously.

U.S. Pat. No. 3,422,402 teaches an arrangement which involves by means of indirect memory addressing the use of large read only memories in which there is but one bit work for each main memory word. The system includes a main memory, a first memory address register for selecting address locations in the main memory, a second memory address register with substitute address locations connected to the main memory, and a read only memory device adapted to be substituted for bad addresses in the main memory. A decoder is used for directing an address with defective bits into a substitute position of the read only memory and out to the second register in the substitute address locations for corrected interrogation of the main memory.

IBM Technical Disclosure Bulletin, Vol. 14, No. 5, October 1971, on pages 1513 and 1514, describes still another on chip redundancy scheme that requires an additional reset line in the $X$ and $Y$ directions and two specialized types of decoder circuits so that a bad word or bit line with a given address may be replaced with another word or bit line and still utilize the same address.

SUMMARY OF THE INVENTION

The present invention teaches a memory storage system utilizing memory storage arrays each of which has incorporated therein a main storage array together with an additional redundant array comprising a group of cells which may be temporarily or permanently substituted for a defective sector of the main storage array.

The object of the invention is therefore to provide an improved memory system which is capable of reliable operation even though defective bits are contained in the main storage array.

Another object of the invention is to provide an improved memory system capable of automatically accommodating for defective memory bit locations.

Still another object of the invention is to provide an improved memory system in which defective memory locations can be substituted for electronically and the substitution retained even when all power to the system is shut off.

A further object of the invention is to provide an improved memory system utilizing monolithic semiconductor arrays.

Still a further object of the present invention to provide a means whereby a defective line or cell in a main memory array can be replaced by a redundant line or cell in the field through software.

It is yet another object of the invention to provide substitution of the redundant line for a defective line at any level.

It is still further another object of the invention to provide for testing of redundant lines in a memory array simultaneously with or subsequent to the testing of the main memory array without the need of permanently deciding prior to testing of the redundant line that the redundant line is to be substituted for a defective line in the memory array.

The present invention in particular provides a memory system in which bad bits in a memory array can be substituted for, either temporarily or semipermanently, either at the time of testing or subsequently.

This is particularly accomplished by making the memory array larger than necessary so that a redundant line is situated in the array which redundant line can be substituted for a line in the main memory array containing one or more defective locations and coupling between the line containing the defects and the redundant line, a circuit containing cross coupled non-volatile memory devices which can switch the input address from the defective line to the redundant line. The circuit will not only switch the address to the redundant line but also by selectively biasing the level of the non-volatile devices, retain the redundant line in a substituted position even when no power is provided to the array. The circuit thus acts to remember the state in which it was set thereby latching the redundant line, in the system, for the line containing defects or bad bits so that the line containing bad bits is never addressed. Thus once switched, the address input to the memory system will always be automatically directed into the redundant line unless the latch is positively reset to its original state.

If the entire array initially contains all good bits and does not contain defective bits, the circuit of the invention is not used yet it remains available for subsequent substitution of the redundant line if during field operation a line or bit becomes defective.

The foregoing and objects, features and advantages of the invention will be apparent from the following more particular description of the preferred embodiments of the invention taken in conjunction with the accompanying drawing.

DESCRIPTION OF THE PREFERRED EMBODIMENT

Figure 1:
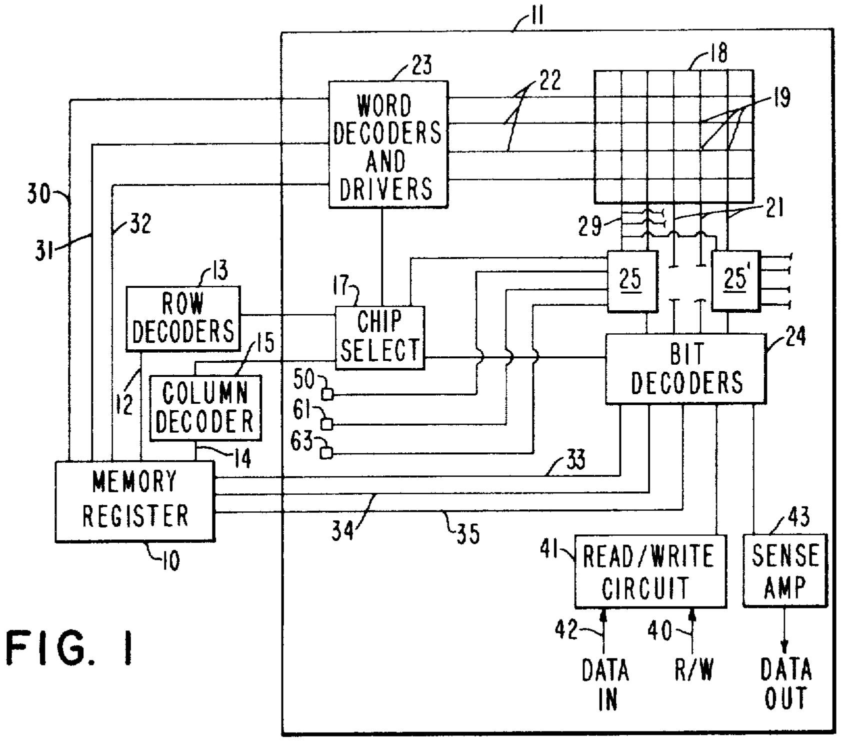
FIG. 1 is a diagramatic illustration of a simple memory system employing the concepts of the present invention.

A memory system incorporating the present invention in a memory array by adding to each semiconductor chip, forming the array, an extra word line thereby providing extra storage positions in the chip which can be used to replace any other word line containing a defective storage position together with a circuit for redirecting an address, initially directed to a word line containing the defective storage position, to the extra word line is schematically illustrated in FIG. 1. Such memory systems, in general, comprise a plurality of storage cards (not shown) mounted on a memory board (not shown). The memory is addressed by means of an address stored in an address register 10 from which extend a sufficient number of address lines to serve each storage card.

Although in practice there are preferably many such storage cards mounted on the memory board and each storage card usually comprises a plurality of modules containing a number of chips 11, only one such chip 11 need be discussed at this time to describe the present invention. The address lines drive all chips, in all modules, on all cards, in the following manner: selected address lines 12 are fed into a row decoder 13 on each storage card where the signals of the lines are decoded to select one row of chips upon the card. Each output line of the row decoder drives but one chip in each row of modules. Other address lines 14 extend to a column decoder 15 to select one column of chips on the card. Each output line of the column decoder 15 drives all chips within the respective column of modules. When there is a coincidence between the row address and the column address, determined by a chip select circuit 17 into which they are fed, then only one chip is selected and powered up for a read or write cycle.

Each chip 11 of the invention, as shown in FIG. 1, includes an array 18 containing a plurality of storage locations or storage cells 19. These cells are collected into a main group defined by bit lines 21 and lines 22. The word lines 22 are coupled into a series of word decoders and drivers 23. The bit lines 21 are coupled into a series of word bit decoders and sense preamplifiers 24. Each of these bit lines 21 is also coupled, via a plurality of circuits 25, of which only two 25 and 25' are shown, to a redundant bit line 29.

The cells forming this redundant line 29 are, in accordance with the invention, available for substitution in place of a failing line in the main group of cells.

Following the fabrication of a chip with such a redundant word line thereon, it is tested before it is mounted into the modules and used in the memory system. During the final test sequence, such chips are sorted depending on whether or not they have defective cells therein.

Initially, all the cells in the main group of cells defined by bit lines 21 and word lines 22 are tested. If all cells in the bit lines 21 are good, the circuits 25 are set so that the redundant line 29 is not accessed.

If any one of these bit lines is defective in itself or contains a defective cell, the redundant bit line 29 must be substituted therefor. This substitution is accomplished by diverting the input address from the normally addressed bit line to the redundant line via the switching circuits 25 which is coupled to each bit line.

A memory system using such a chip in its main memory operates as follows. If the particular chip selected by the coincidence between the row and column addresses and switched to a high power state contains all good cells in the bit lines 21, the memory system operates as follows: following activation of the chip into a high power state, the word decoders and drivers 23 are activated by signals on address lines 30, 31, and 32. The bit decoders 24 are simultaneously activated by signals on address lines 33, 34 and 35. The signals on address lines 30, 31 and 32, sent to the word decoders and drivers 23, are decoded such that one and only one of the word lines 22 is selected and driven.

Signals of the three bit address lines 33, 34 and 35 are sent to the bit decoder 24 where they are decoded and used to activate a selected one of the bit lines 21. The coincidence of the applied power to the selected word line and the selected bit line selects but one particular cell at the intersection of both lines.

The decoded bit address is also connected to the switching circuit 25. Since, however, in this case no defective cell exists in the array, the circuits 25 are not activated and the array operates in its normal manner.

Data is stored in the selected storage cell by the coincidence of a write pulse on input 40 of a read-write circuit 41 together with a data input pulse on input 42. This coincidence conditions one of the bit lines, which has been decoded by the address lines and the data is directed into the selected decoded storage cell by the selected bit line.

When only a read pulse is present on an input 40 the condition of the selected storage cell is read and the state of the cell detected by a sense amplifier in bit decoder circuit 24 and fed to a final sense amplifier 43, which in turn sends data out to the storage card.

Additional details of such chip array decoders, sense preamplifiers, amplifiers and other circuitry are well known to those skilled in the art.

If the chip to be so used contains one or more defective cells in the main group of cells, defined by bit lines 21 and word lines 22 it becomes necessary to activate the redundant line 29. In this case the memory system operates as follows: following activation of the chip into a high power state, the word decoders and drivers 23 are activated by signals on the address lines 30, 31 and 32 and the bit decoders 24 are simultaneously activated by signals on the address lines 33, 34 and 35. Thus once again a single selected cell in the array is addressed in exactly the same way that the cell in the totally good chip was addressed.

Again, the signals on word address lines 30, 31 and 32 are simultaneously sent to the circuits 25. Now, however, if the input address from the memory address register, via leads 33, 34 and 35 compares with a known bad address the switching circuit 25 associated with that bit line is activated to disenable the bad bit line 21 and activate the redundant line 29.

Data can now be stored into or read out of the redundant line 29 exactly as if it were the originally addressed line.

In summary, the disclosed invention involves the addition of an extra bit (or word) line to a memory array which is functionally organized with its own decoders. All input address of (*n*) binary bits is functionally decoded to access one sector of the chip which previously had been tested and the address of any defective sector is switched to the redundant line 29 such that the defective line is never accessed.

Figure 2:
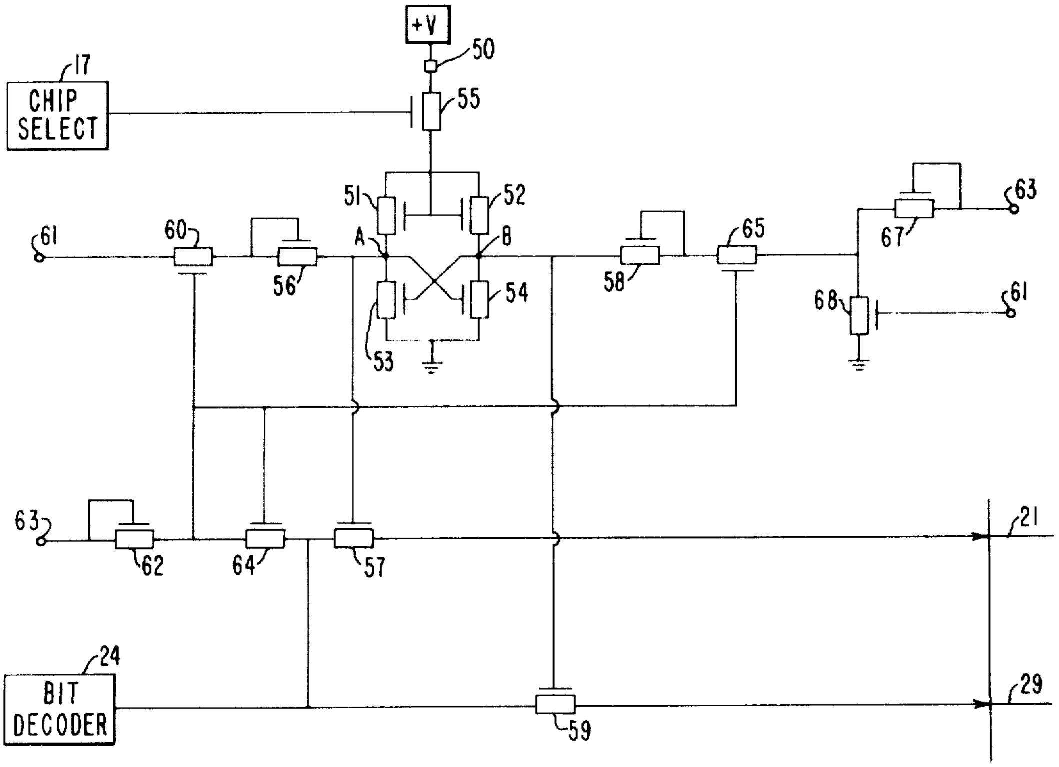
FIG. 2 schematically details the logic functions of the invention in MOS technology.

FIG. 2 shows the details of the switching circuit 25, used to switch the decoded bit address from the defective line to the redundant line 29, as it is performed in field effect transistor (FET) technology.

Basically the circuit utilizes transistors 51, 52, 53, and 54 which make up a symmetric flip flop. Transistors 53 and 54 are so called MNOS (metal nitride oxide semiconductor) transistors which have a memory built in such that they can be made to remain in a fixed state for a long period of time, i.e., in excess of one month, even when no power is being applied thereto.

Transistors 51 and 52 have their gates coupled together to their drains to act as diodes in series with an impedance. The gates of FET's 51 and 52 are also connected to the source of FET 55 whose gate is connected to the chip select circuit 17 and whose drain is connected via input terminal 50 to a positive voltage source *+V*.

The source of transistor 51 is coupled to the gate of transistor 54, the source of transistor 56, and the gate of transistor 57, while the source of transistor 52 is coupled to the gate of a transistor 53, the source of transistor 58 and the gate of transistor 59. The source of transistors 53 and 54 are coupled to ground. The drain of transistor 56 is coupled to its gate and to the source of a transistor 60 which, in turn, has its drain coupled to an input 61. The gate of transistor 60 is coupled through a transistor 62 connected as a diode to a second input 63 and through a transistor 64, again connected as a diode, to the drain of transistor 57 and to the gate of of a transistor 65 coupled to the drain (and gate) of transistor 58. The drain of transistor 65 is in turn coupled to the drain of a transistor 68 whose gate is connected to the input 61 and whose source is connected to ground. The drain of transistor 65 is also coupled to the source of a transistor 67 whose drain and gate is connected to the input 63. The source of transistor 57 is in turn coupled to a particular bit line 21. The drain of transistor 57, is not only coupled to transistor 64, but is also coupled to the bit decoder 24 and to the drain of a transistor 59 whose source is connected to the redundant line 29.

The circuit 25 just described permits for the replacement of bit line 21 with the redundant line 29 at any time. That is, during initial tests or in the field. Moreover the decision is reversible, that is, the original bit line can be restored and the redundant line used for another purpose. Also a decision to switch in the redundant line or not to switch in the redundant line can be made semipermanent, i.e., the decision can be retained until it is purposely altered. This retention does not require a continuous power to the chip since the described circuit has its own built in memory contained in the cross coupled devices 53 and 54.

The circuit operates as follows. Initially a signal from the chip select circuit 17 is applied to the gate of transistor 55 causing it to turn on. This in turn causes a voltage from source +*v*, normally for FET devices about 3.6 volts, to be applied to node A which is the connection point between the gates of transistors 54 and 57 and the drain of transistor 53. This voltage is also applied to node B which is the junction of the gate of transistor 53, the drain of transistor 54 and the gate of transistor 59. If the redundant line 29 is not to be addressed, such as for example, during the initial testing of the bit lines, a positive voltage of about 3.6 volts is applied to inputs 61 and 63. When input 63 is coupled to this voltage, device 62 turns on as does devices 60, 64, 65 and 67. Application of this voltage to input 61 when the bit line is decoded causes transistors 56, 57 and 68 to turn on. Thus the node B becomes driven only by transistor 52 while node A becomes driven by what is effectively two diodes in series, that is, transistors 51 and 56. Thus, node A becomes driven through a lower impedance than node B and transistor 54 is caused to turn on. When transistor 54 turns on node B is coupled to ground. This causes transistor 53 to become turned off letting node A rise towards the applied 3.6 volts. As node A rises towards this voltage device, device 57 becomes turned on and the bit line 21 is connected to the bit decoder through transistor 57. When node B goes to ground transistor 59 becomes turned off and the redundant line 29 is disconnected from the bit decoder.

The bit line 21 can now be tested. If it is found to contain a defective bit it becomes necessary to switch the input address over to the redundant line so that it can be substituted for the bit line containing the bad storage locations. This switching over, to the redundant line, is accomplished by maintaining the input 63 at about 3.6 volts and grounding input 61. Grounding of input 61 causes transistor 68 to turn off thus driving the drain of transistor 65 towards 3.6 volts applied from input 63 through transistor 67. Simultaneously node A is caused to float since the gate of transistor 56 is also pulled to ground. Because the source of transistor 65 is is now raised to two thresholds below the voltage applied to input 63, through transistor 67, node B begins to rise toward this positive voltage. Node A is however prevented from rising toward the voltage due to the fact that input 61 has now been grounded. Thus transistor 53 becomes turned on to couple node A to ground and transistor 54 turns off causing node B to become more positive. When node B becomes more positive transistor 59 is turned on coupling the redundant line to the bit decoder 24 and simultaneously, as node A goes to ground, transistor 57 shuts off to disconnect the bit line 21 from the bit decoder 24.

Once the redundant line is connected to the bit decoder 24 it is tested. If it is found to contain good bits it can be permanently latched to the bit decoder line through transistor 59 by raising the voltage applied to input 63 from about 3.6 volts to about 22 volts. The application of this high voltage to input 63 causes charges in transistor 53 to migrate to the surface of the silicon body thus permanently lowering the threshold of transistor 53 with respect to that of transistor 54. Henceforth a significantly lesser voltage, i.e., 3.2 volts will cause transistor 53 to turn on. Thus whenever transistor 55 is turned on by an input from the chip select circuit !7 transistor 53 will be preferably caused to turn on and node A will be grounded. If it is later found that the redundant bit line contains errors or bad bits and it is wished to restore the original bit line, it is necessary to change the threshold of transisotr 54 to a value equal to or lower than that of transistor 53. This is accomplished by applying a high voltage, i.e., about 22 volts to input 61.

Switching to the redundant line can, of course, be performed while the memory is being tested at the chip level as indicated or it can be performed at any higher level such as the module or card. The chip can also be switched in the field by software or by equipment which would appropriately bias or ground the inputs 61 and 63.

Increases in power dissipation in such a chip are minimized because most of the power of the switching circuit is turned off during normal operation. Finally only one substrate is required for any of the possible combinations of redundant lines and it is not necessary that a multiplicity of substrates be utilized to employ this redundant circuit. Still further the system is reversible in the event that the redundant line becomes defective and it is necessary to restore the system to the original bit line. Thus unlike multiple substrate redundancy systems or fuseable element redundancy systems, the redundancy decision made with the described invention is non-permanent and alterable. Moreover, the decision to substitute or not substitute the redundant line can be retained in the circuit 25 until it is purposely altered.

The product can thus be preset prior to shipment or altered in the field if necessary. This ability of field alteration provides more flexibility in maintenance schemes and even provides greater latitude in basic system memory design.

The present invention can, of course, be extended by providing more than one redundant line on the chip.

While the invention has been particularly shown and described with reference to the preferred embodiment thereof, it will be understood by those skilled in the art that various changes in form and details of the device and the method of making it may be made therein without departing from the spirit and scope of the invention.

What is claimed is:

1. A memory storage system comprising:

a memory storage array containing storage locations, a memory address register for selecting a storage location in said memory storage array, input signal means for providing an input signal to said array, said array comprising a plurality of functionally isolated individual storage locations electrically interconnected into a main storage group and a redundant storage line a circuit coupled to the main storage group and to the redundant storage line said circuit having a first state for directing an input signal from said input signal means to a selected storage location in said main storage group and a second state for redirecting the input signal from the selected storage location in said main storage group to the redundant storage line whenever the main storage group to which the circuit is coupled contains a defective storage location, and biasing means coupled to said circuit for setting said circuit in one of said states, said circuit containing non-volatile, variable threshold devices that can be set to turn on at a selected input voltage.

2. The system of claim 1 wherein there is further provided first means for applying a first voltage to said circuit for setting the threshold of one of said non-volatile, variable threshold devices to cause said circuit to be latched into one of said states.

3. The system of claim 2 wherein there is further provided second means for applying a second voltage to said circuit for unlatching said circuit from the state in which it is set and relatching said circuit in the other of said states.

4. The system of claim 2 wherein said main storage group is divided into a plurality of portions and each portion has a circuit coupled thereto which circuit is also coupled to said redundant storage line.

5. A memory system comprising a memory storage array containing main storage and alternate storage locations, input signal means for providing an input signal to said array, switching means having a first output coupled to said main storage locations, a second output coupled to said alternate storage locations and an input coupled to said input signal means, and control means coupled to said switching means for controlling said switching means to selectively switch the input signal from one of said outputs to the other of said outputs.

6. The system of claim 5 wherein said control means includes a circuit having a first state and a second state.

7. The system of claim 6 wherein said circuit includes non-volatile devices that can semipermanently latch the circuit in one of said states.

8. The system of claim 7 wherein said control means further includes means for applying a first voltage condition to said circuit for setting said circuit into one of said states and for applying a second voltage condition to said non-volatile devices to semipermanently latch the circuit into the state in which it has been set.

9. The system of claim 7 wherein said non-volatile devices comprise metal-nitride-oxide semiconductors.

* * * * *